(12) United States Patent
Forthman et al.

(10) Patent No.: US 9,726,844 B2
(45) Date of Patent: *Aug. 8, 2017

(54) LIGHTED TIP FOR FLEXIBLE RODS

(71) Applicant: Labor Saving Devices, Inc., Commerce City, CO (US)

(72) Inventors: James Forthman, Commerce City, CO (US); David G. Morgan, Commerce City, CO (US); John E. Phillips, Commerce City, CO (US); Roy Bowling, Commerce City, CO (US)

(73) Assignee: Labor Saving Devices, Inc., Commerce City, CO (US)

( * ) Notice: Subject to any disclaimer, the term of this patent is extended or adjusted under 35 U.S.C. 154(b) by 37 days.

This patent is subject to a terminal disclaimer.

(21) Appl. No.: 14/621,180

(22) Filed: Feb. 12, 2015

(65) Prior Publication Data

US 2015/0153534 A1 Jun. 4, 2015

Related U.S. Application Data

(60) Division of application No. 14/039,295, filed on Sep. 27, 2013, now Pat. No. 8,973,900, which is a
(Continued)

(51) Int. Cl.
*G02B 6/44* (2006.01)
*H02G 1/08* (2006.01)
(Continued)

(52) U.S. Cl.
CPC .......... *G02B 6/4466* (2013.01); *H02G 1/081* (2013.01); *A01K 85/01* (2013.01); *F21L 2/00* (2013.01); *F21L 4/00* (2013.01)

(58) Field of Classification Search
CPC ........ H02G 11/02; H02G 1/085; H02G 1/081; H02G 1/083; F21V 21/32; F21V 21/0816;
(Continued)

(56) References Cited

U.S. PATENT DOCUMENTS 3,111,277 A 11/1963 Grimsley
4,002,817 A 1/1977 DeGrado
(Continued)

OTHER PUBLICATIONS

Labor Saving Devices, Inc., Catalog titled "Advancing the Art of Installation", Sep. 12, 2009, vol. 27, 84 pages.
(Continued)

*Primary Examiner* — Monica Carter
*Assistant Examiner* — Seahee Yoon
(74) *Attorney, Agent, or Firm* — Kilpatrick Townsend & Stockton (57) ABSTRACT

In one aspect, a lighted tip for attachment to a flexible rod comprises a tip body having proximal and distal ends, a mechanical connector at the proximal end, a lens connected to the distal end, a light source that emits light through the lens, and a holder coupled to the light source and the lens. A circuit is completed or interrupted as the holder moves in relation to the tip body, thereby switching the light source on or off. In another aspect, a lighted tip for attachment to a flexible rod comprises a lens forming a distal end of the lighted tip. The lens is cylindrical over at least some of its length, and the tip further includes a light source at least partially within the cylindrical lens portion and a mechanical connector at a proximal end if the lighted tip, for connecting the tip to the flexible rod.

7 Claims, 8 Drawing Sheets

Related U.S. Application Data continuation of application No. 12/941,748, filed on Nov. 8, 2010, now Pat. No. 8,544,822.

(60) Provisional application No. 61/259,546, filed on Nov. 9, 2009.

(51) Int. Cl.
*A01K 85/01* (2006.01)
*F21L 2/00* (2006.01)
*F21L 4/00* (2006.01)

(58) Field of Classification Search
CPC ... F21V 21/002; F21L 4/06; F21L 4/08; F21L 4/027
See application file for complete search history.

(56) References Cited

U.S. PATENT DOCUMENTS

| | | | | |
|---|---|---|---|---|
| 4,109,405 | A * | 8/1978 | Ito | A01K 85/01 200/81 R |
| 4,348,715 | A * | 9/1982 | Christensen | F21V 33/008 362/109 |
| 4,684,211 | A | 8/1987 | Weber et al. | |
| 4,768,137 | A * | 8/1988 | Hwaw | B25B 23/18 362/120 |
| 5,070,437 | A * | 12/1991 | Roberts, Sr. | A01K 85/01 362/158 |
| 5,820,249 | A * | 10/1998 | Walsten | H02G 1/081 362/119 |
| 6,007,214 | A | 12/1999 | Shiao | |
| D479,888 | S | 9/2003 | Sharrah et al. | |
| 6,680,844 | B2 | 1/2004 | Kim | |
| 6,726,502 | B1 | 4/2004 | Hayes | |
| 6,874,908 | B2 | 4/2005 | Sharrah et al. | |
| 7,025,333 | B1 | 4/2006 | Gianturco | |
| 7,150,448 | B1 | 12/2006 | Swift | |
| 7,458,708 | B2 | 12/2008 | Sheng | |
| 8,033,678 | B2 | 10/2011 | Patterson | |
| 8,544,822 | B2 * | 10/2013 | Forthman | G02B 6/4466 254/134.3 FT |
| 2008/0221482 | A1 | 9/2008 | Mondry et al. | |
| 2011/0272651 | A1 | 11/2011 | Forthman et al. | |
| 2013/0194784 | A1 | 8/2013 | Yu | |

OTHER PUBLICATIONS

Pushpullrods.com, LED Lighted Tip, web page pushpullrods.com/Merchant2/merchant.mvc?Screen=PROD&Store_Code=P&Product_Code=PP-L accessed Feb. 15, 2011, 1 page. Product depicted was available at least as early as Sep. 2009.

* cited by examiner

LIGHTED TIP FOR FLEXIBLE RODS

CROSS-REFERENCES TO RELATED APPLICATIONS

This application is a division of U.S. patent application Ser. No. 14/039,295, filed Sep. 27, 2013, entitled "Lighted Tip For Flexible Rods," which is a continuation of U.S. patent application Ser. No. 12/941,748, filed Nov. 8, 2010, now U.S. Pat. No. 8,544,822, issued Oct. 1, 2013, entitled "Lighted Bullnose Tip for Flexible Rods," which claims the benefit of U.S. Provisional Patent Application No. 61/259,546, filed Nov. 9, 2009, entitled "Lighted Bullnose Tip (LBT) for Flexible Rods," the entire disclosures of which are hereby incorporated by reference herein.

BACKGROUND OF THE INVENTION

When additional wired electrical or communications capacity is required in existing building structures, new wire or cable must be installed in the structure. The installation of wire or cable into existing building structures (i.e., not during new construction) is commonly known as "retrofit" wire and cable installation. It is cost prohibitive to remove sections of wall board to gain access to in-wall cavities and then re-finish the wall to repair the facility to its pre-installation condition. Retrofit wire or cable installation requires specialized tools to "fish" the wire through the finished structure in enclosed spaces, preferably with minimal damage to existing structural and finished aesthetic elements. This requires specialized tools that allow access into and across finished walls, ceilings and under carpet.

BRIEF SUMMARY OF THE INVENTION

According to one aspect, a lighted tip for attachment to a flexible rod comprises a tip body having proximal and distal ends, a mechanical connector at the proximal end, a lens connected to the distal end, a light source that emits light through the lens, and a holder coupled to the light source and the lens. A circuit is completed or interrupted as the holder moves in relation to the tip body, thereby switching the light source on or off.

According to another aspect, a method of routing a wire comprises attaching a lighted tip to a flexible rod. The lighted tip includes a tip body having proximal and distal ends, a mechanical connector at the proximal end, a lens connected to the distal end, a light source that emits light through the lens, and a holder coupled to the light source and the lens. A circuit is completed or interrupted as the holder moves in relation to the tip body, thereby switching the light source on or off. The method further includes connecting a wire to the lighted tip, and manipulating the flexible rod to direct the lighted tip along a desired route such that the lighted tip pulls the wire through the desired route.

According to another aspect, a lighted tip for attachment to a flexible rod comprises a translucent, transparent, or substantially transparent lens forming a distal end of the lighted tip. The lens is cylindrical over at least a portion of its length, and the lighted tip further includes a light source disposed at least partially within the cylindrical portion of the lens and a mechanical connector at a proximal end if the lighted tip, for connecting the lighted tip to the flexible rod.

BRIEF DESCRIPTION OF THE DRAWINGS

The drawings illustrate one embodiment of a lighted tip in accordance with the principles of the invention. It is to be understood that this embodiment is exemplary and not limiting.

DETAILED DESCRIPTION OF THE INVENTION

One common approach to retrofit wire installation is to "fish" the new wire or cable from a starting point to a finishing point by entering the wall at a desired location, creating a path by drilling or other means through fixed structural elements such as wall board, wall studs, in-wall fire breaks, structural headers, across attic or crawl spaces, and through conduit, insulation, etc., and then maneuvering a flexible rod through the path to the desired access location where the wire or cable is then attached to the distal end of the rod and pulled through the structure. Alternatively, the wire or cable can be attached to the rod and pushed through the structure to the desired location. In either approach, the new wire or cable is installed by connecting two points across a structure with as few as only one or two breaches of the finished wall board. The structural integrity of a rod is needed to push or pull the wire/cable through the structure. Flexibility in the rod is required because the rod must be capable of bending within the structure to allow alignment to the desired path (aligning with holes for example). Fiberglass is the preferred rod material as it offers durability, lightweight, strength and flexibility in a cost effective manner.

In multi-story structures, new wire or cable may require installation up or down multiple floors. For example, a common approach for retrofit installation requires going up or down a floor to provide a way of crossing the room or space. The typical process includes entering a wall through a small cutout (smaller than a typical cable connector face place, for example), creating a wire or cable path up into an attic, across that attic space, and then down into an opposing wall cavity or into a wall space located in another room using drill bits and other specialty tools, and then pulling or pushing wire or cable through the desired path using multiple steps using flexible rods and related accessory tips and components. Doing this requires a degree of special skill and experience, and an industry of professional retrofit installers has evolved to fit the need.

Because structural cavities such as attics and wall cavities are almost always fully enclosed in retrofit situations, the cavity space is totally dark thereby prohibiting an operator from visualizing tools, drill holes or the cable itself during the installation process without specific illumination to do so. The use of a hand-held flashlight to illuminate the desired space inside a cavity may be prohibited because of contours, angles or structural inaccessibility. Additionally, since the size of the access hole into the wall must be minimized, gaining a line of sight into the cavity is difficult. As a result, retrofit installers sometimes deploy flexible rods manufactured with a special luminous (like a glow in the dark watch face) material to allow the rod itself to glow in the dark and thereby provide a visible marker. This luminescence allows the installer to locate the distal end of the flexible rod across a darkened or restricted space when luminous rod has been previously "charged" by exposure to bright light. This chemical luminescence is, by its nature, limited. For example, the luminous energy dissipates over time. Thus, installers must often take the extra step of light charging their flexible rods to maximize the luminous energy immediately prior to its use in an installation procedure. This step takes extra time, and in retrofit installation time is money. Even when fully charged, these luminous rods dissipate the limited light energy and the luminescence "re-charging" capability may degrade over time.

For retrofit installation, it is desirable to have a source of much brighter light at or near the distal end of these flexible rods. Chemical luminous materials incorporated into conventional fiberglass rods do not provide the bright light desired. One possible solution would be to externally attach a bright light source, such as an incandescent or LED (light emitting diode) flashlight, externally onto the flexible rod. (One example of such a solution is the GRABBIT™ clip-on LED light available from Labor Saving Devices, Inc. of Commerce City, Colo., USA). This solution, however, has several disadvantages. The primary disadvantage is the exposure of the attached light source to obstacles that may exist across the desired path for retrofit installation. When the light is externally attached, it may catch on objects when being maneuvered. For example, in retrofit installation it is often necessary to drill holes through structural elements such as wall studs, top plates, fire breaks and other structures. These holes require elongated flexible drill bits to allow the bit to be inserted into a structural cavity at a location distant from the desired location of the hole to be cut and distorted against existing structural elements to align the bit in the desired position and location to cut a hole.

This is the technique used, for example, when running new wire from a wall outlet location up into an attic space. The flexible drill bit is inserted at the outlet location and distorted along the corner of a wall stud and the back of the wall cavity to a location up to the structural header which bisects the wall cavity and the adjacent attic space. It is desirable to make the hole as small as possible. The larger the hole, the larger the required drill bit outer diameter. In turn, the larger the diameter of the drill bit, the less flexible and maneuverable it will be. Thus, the flexible push-pull rods and related accessories and tips are made of a diameter small enough to optimize the strength and flexibility requirements. The most common retrofit push pull rods fit into ⅜" holes. Adding some external attachment to the flexible rod compromises this optimization of hole size and rod diameter as it applies to retrofit wire and cable installation. Attached light sources can catch on structural elements and be dislodged, or otherwise fouled by loose insulation or other materials. Additionally, conventional light sources and flashlights have been too large to fit into a common ⅜" hole in a linear fashion with a push-pull rod.

Therefore, the essence of the motivation behind the invention is the unmet need for a bright point of illumination that can be removably positioned at or near the distal end of common (⅜" or smaller) retrofit installation rods in a way that overcomes the disadvantages outlined above.

In accordance with embodiments of the invention, a detachable lighted tip can be positioned at the distal end of flexible push-pull rod (⅜" or smaller) used in retrofit wire and cable installation. In the preferred embodiment, the detachable tip is thus sized at 5/16" nominal diameter and less than 1½" in length. The detachable tip includes a light source at the distal end, a body, and a mechanical connector at the proximal end. The proximal mechanical connector is configured to mate to an adjacent mechanical connector affixed to the distal end of a flexible push-pull rod. In the preferred embodiment, the light source is an LED light, the body is cylindrical, and the mechanical connector is either threaded or utilizes a "quick connect" feature. One example of a quick connect feature is included in the ROYRODS™ rod system available from Labor Saving Devices, Inc. of Commerce City, Colo., USA.

Also in the preferred embodiment, the distal end of the lighted tip includes a rounded (or "bullnose") translucent or substantially transparent dome-shaped lens, constructed of durable LEXAN® or another suitable material, to protect the internal LED light source and battery. The LED and the battery are located within the tip body between the proximal and distal ends. The lens includes a through-hole to allow mechanical attachment of bare wire by inserting the wire through the hole and bending it back upon itself In the preferred embodiment, a longitudinal hole is also included to allow the LED light energy to be channeled in a focused straight beam. This allows attachment of a wire or leader of some type to the tip (the wire may be further attached to a specialty cable or the like). Preferably, the through-hole can be provided in the translucent dome itself. Alternatively, the through-hole could be provided adjacent to the translucent dome lens, but made as part of the body. The lens can also be configured to diffuse the LED light energy in a desired light pattern or in a desired color. The overall structure of the lighted tip is such to provide a smooth transition surface from the tip to the rod, minimizing any surfaces that may catch on structural elements across the desired path to be traversed. The lens may be permanently affixed to a part of the body in a sealed manner. The light also includes a mechanical on/off switch. For example, the light source and lens may be coupled to a threaded holder that mates with the tip body, so that an electrical circuit is completed or interrupted as the threaded holder is turned and thereby moves within the tip body.

Further features in the preferred embodiments include structural durability. The materials used in the distal tip, the body and the proximal connector are selected for strength and long life. In the preferred embodiment, the materials selected optimize strength with light weight and longevity along with low cost and manufacturability—specifically metal and plastic. In the preferred embodiment the body is made of shock resistant steel and the lens is fabricated from LEXAN® material.

Many variations are possible within the scope of the appended claims. For example, the tip body may be made of other materials. Possible materials include aluminum or other metals/alloys, ceramic, luminous clear or tinted plastic, or other suitable materials. The tip body may preferably be made of a material having durability, low cost, and ease of manufacture. The body itself may be made to be flexible. While the embodiment shown in the figures and discussed below includes three stacked cylindrical batteries, the device could use more or fewer batteries, for example a single battery.

In some embodiments, the tip body may be other than cylindrical in configuration. The body may include a lubricous coating to facilitate ease of transition across surfaces or through insulation, etc. The body may have more than one piece (i.e., be assembled from two or more pieces that screw together to allow access to the battery). The body is preferably sealed to provide water resistance and protect against contamination. In some embodiments, the body may include some form of marking or color coordination related to source of manufacture (logo, etc.).

Variations are also possible in the distal end of the tip body and in the lens. For example, the distal end may include a lubricious coating to facilitate ease of transition through and across surfaces. The distal end is also preferably sealed to provide water resistance and protect against contamination.

The lens material may be clear or may be tinted. The color of tint may provide a visual coding, whereby multiple rods can be differentiated by color of illumination. As an alternative embodiment, different color light sources, for example different color LEDs, can be used thereby removing the need to tint the lens. In this embodiment, the lens would preferably be clear. In some embodiments, the lens may be configured to provide specific illumination patterns. For example, evenly diffused light (sphere of illumination), a focused linear beam, a circular beam perpendicular to the longitudinal axis of the rod but in a plane, etc., or combinations of the above or other patterns.

More than one through-hole may be provided through the lens or another part of the lighted tip. The longitudinal hole may be omitted. Various combinations of hole arrangements are possible. In some embodiments, the longitudinal hole may contain threads to allow threading of other attachments to the end of the lens. The distal end of the lighted tip may include a distal connector to allow additional attachments at the distal end of the light source. Such a connector may include a threaded or quick connect connector.

Variations are also possible in the light source and its operation. While the preferred source is an LED, other kinds of light sources may be used, for example an incandescent lamp or other light source. The light source may be of any single color (white blue, red, green, e.g.), or any combination of multiple colors may be used, for example by use of a multicolored LED. The light source may have a flashing or strobe feature. A plurality of lights may be employed in the same tip.

Other switching arrangements may be used. For example, the light source could be switched on and off using a slide switch, a depressed button, or a switch activated by radio frequency (RF) or other communications. Other kinds of switching arrangements are possible.

In some embodiments, a lighted tip may be bundled or combined with other related items. For example a lighted tip may be combined with one or more batteries. In another example, a lighted tip may be combined with one or more tinted lenses. In some embodiments, each lens may be an integral lens/ half body component to allow ease of connecting to the mating part of the remaining portion of the body. In another example a lighted tip may be combined with a separate connecting member, such as a mechanical connector or a rod having a mechanical connector.

The figures illustrate one exemplary embodiment of the invention. All dimensions given in the drawings are exemplary only, and it is to be understood that the claims encompass other embodiments having different dimensions and configurations.

Figure 1:
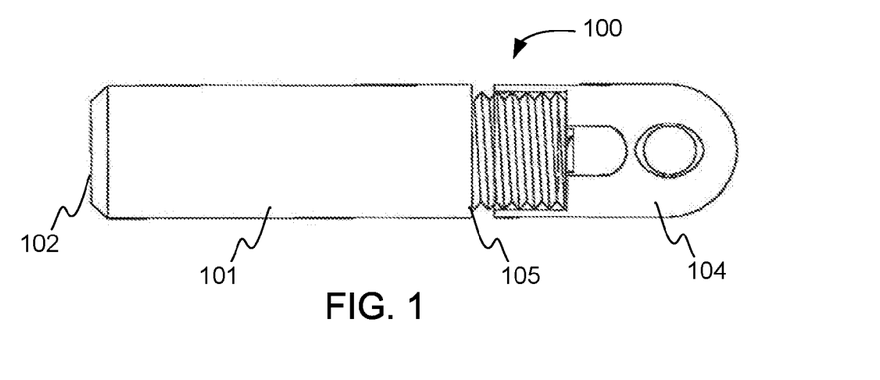
FIG. 1 illustrates a lighted tip in accordance with embodiments of the invention.
Figure 2:
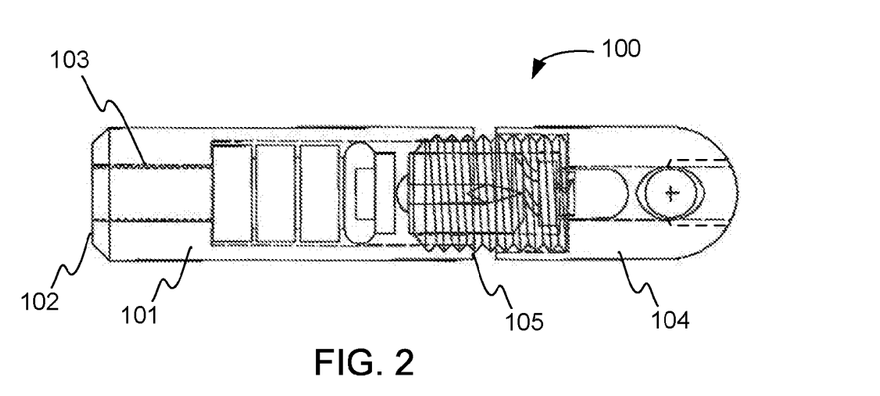
FIG. 2 shows a cutaway view of the lighted tip of FIG. 1.
Figure 3:
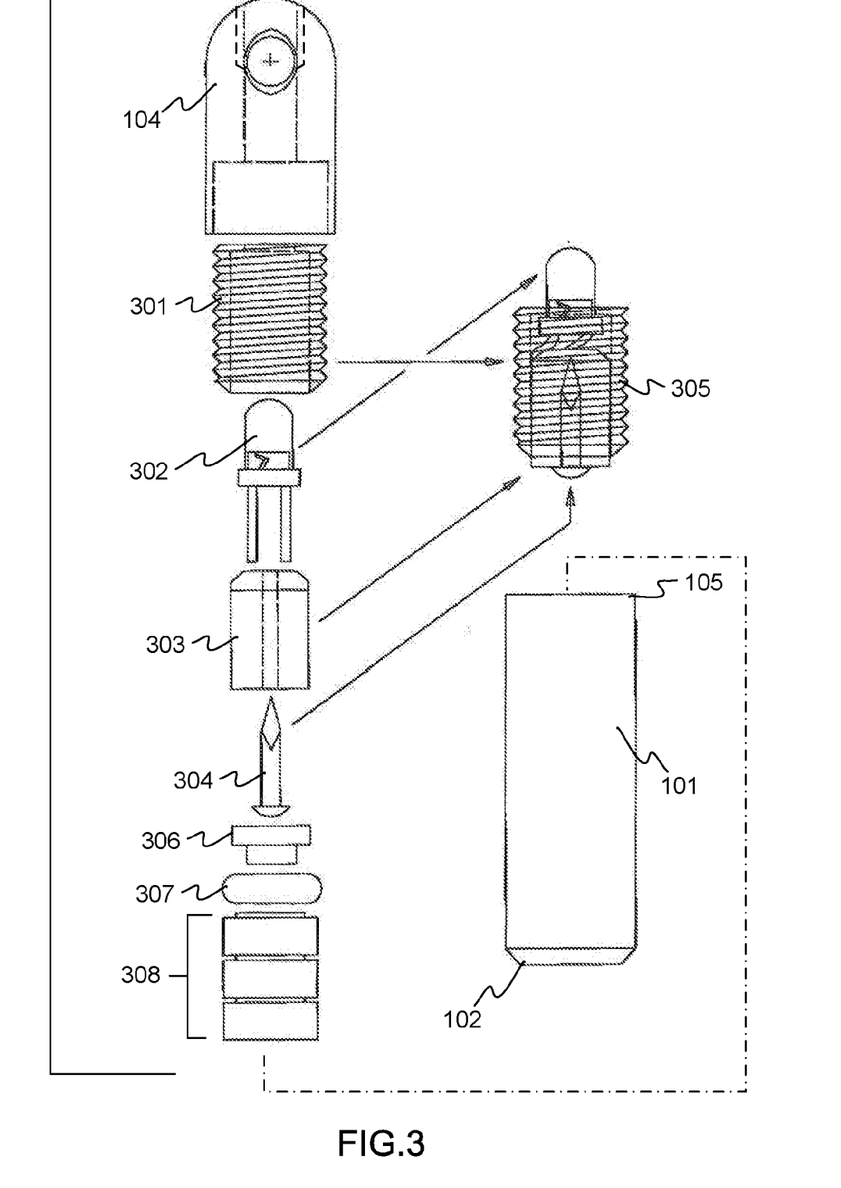
FIG. 3 shows an exploded view of the lighted tip of FIG. 1.

FIG. 1 illustrates an exemplary lighted tip 100. FIG. 2 shows a cutaway view of lighted tip 100, and FIG. 3 shows an exploded view. Referring to FIGS. 1-3, example lighted tip 100 includes a main body 101 having a proximal end 102, and a mechanical connector 103 at the proximal end 102. In the embodiment shown, the mechanical connector is a simple threaded hole, although other kinds of connectors may be used, for example a quick connect connector. A lens 104 resides at the distal end of lighted tip 100. A threaded lamp holder 301, in conjunction with an LED 302, an insert 303, and a brad 304 make up a lamp assembly 305 that can thread into a distal end 105 of main body 101. Other kinds of components may be used, for example other kinds of light sources may be used in place of LED 302, of other conductive members may be used in place of brad 304. A contact member 306 is normally spaced by an o-ring 307 from a battery pack 308.

In this embodiment, one leg of LED 302 may be placed in the central hole of insert 303 to make electrical contact with brad 304, and the other leg of LED 302 may reside outside of insert 303, to make electrical contact with lamp holder 301. One terminal of battery pack 308 also makes electrical contact with main body 101.

This arrangement provides a way of switching LED 302 on and off, by turning lamp assembly 305 to adjust how far it is threaded into main body 101. As lamp assembly 305 is threaded into main body 101, o-ring 307 is compressed, until contact 306 contacts battery back 308. This completes a circuit wherein current may flow from battery pack 308, through contact 306, through brad 304, through LED 302, through lamp holder 301, through main body 101, and back to battery pack 308. (The reverse is also possible, depending on the kind of light source used and its installation polarity if significant.) With the circuit complete, LED 302 is illuminated. LED 302 may be turned off by turning lamp assembly 305 so that it moves away from battery pack 308, until the circuit is interrupted when o-ring 307 lifts contact 306 away from battery pack 308.

Figures 4A, 4B:
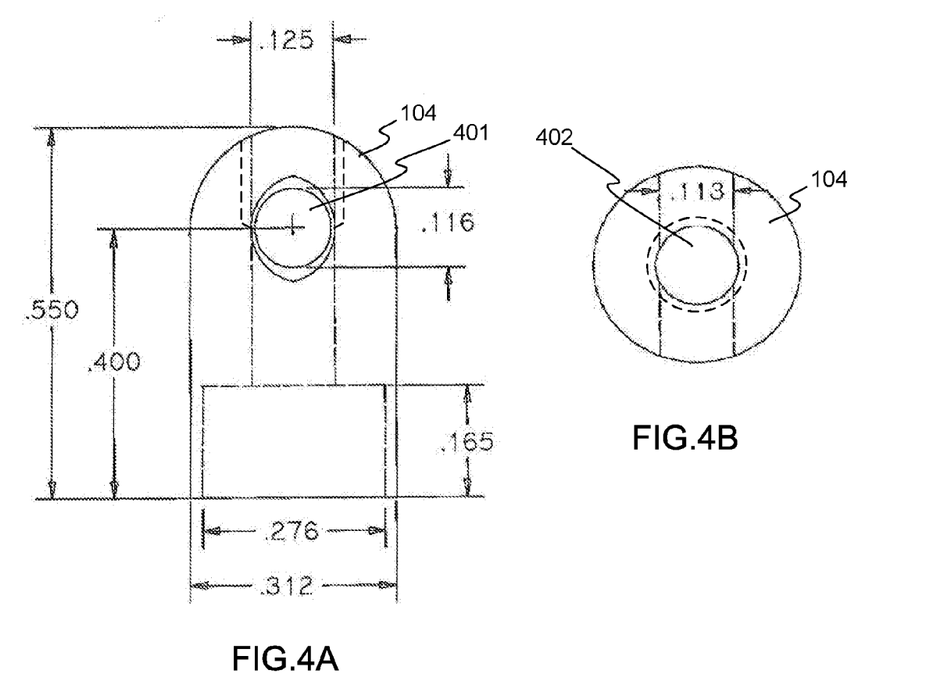
FIGS. 4A and 4B illustrate side and end views of the tip of FIG. 1.

FIGS. 4A and 4B illustrate side and end views of exemplary lens 104. Lens 104 may be made of LEXAN® or another suitable material, and may be transparent or translucent. In this example, lens 104 defines a transverse hole 401, and a longitudinal hole 402. Other arrangements are possible. For example, lamp holder 301 or another component may define a transverse hole. Lens 104 is preferably securely attached to lamp holder 301, so that lens 104 and lamp assembly 305 may be turned together as a unit. For example, lens 104 may be tightly threaded to lamp holder 301, may be fixed to lamp holder 301 using an adhesive, or may be secured in another way.

Figure 5:
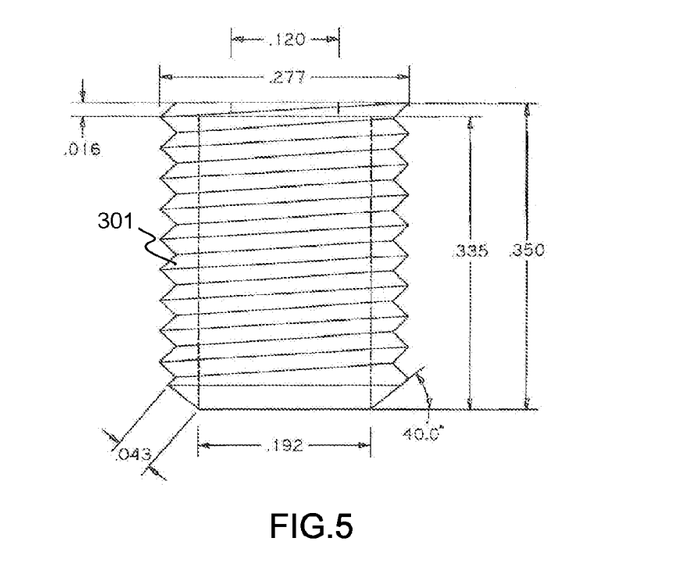
FIG. 5 illustrates an exemplary lamp holder.

FIG. 5 illustrates exemplary lamp holder 301 in more detail.

Figure 6:
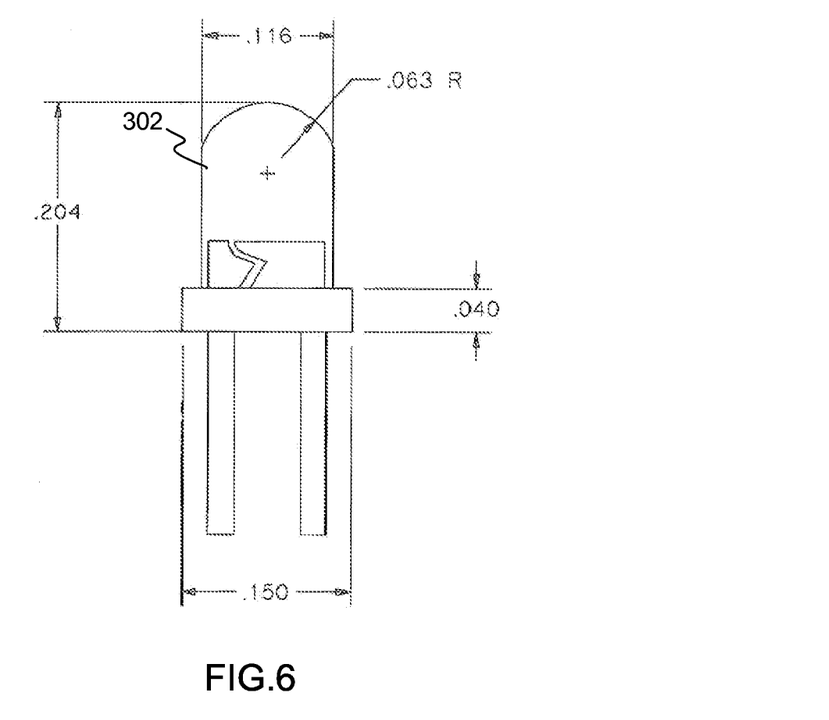
FIG. 6 illustrates an exemplary light source.

FIG. 6 illustrates exemplary LED 302 in more detail.

Figure 7:
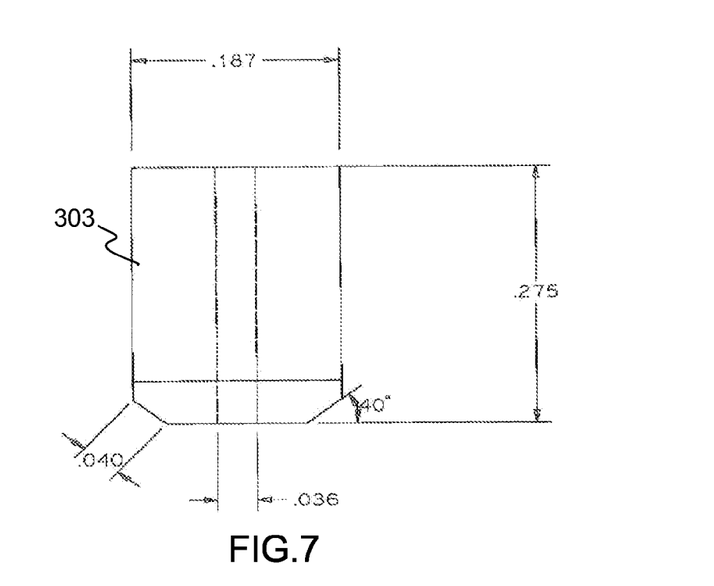
FIG. 7 illustrates an exemplary insert.

FIG. 7 illustrates exemplary insert 303 in more detail. Insert 303 is preferably made of a durable, non-conductive material, for example Teflon®, an acetal homopolymer such as that available commercially as Delrin®, or another suitable material.

Figure 8:
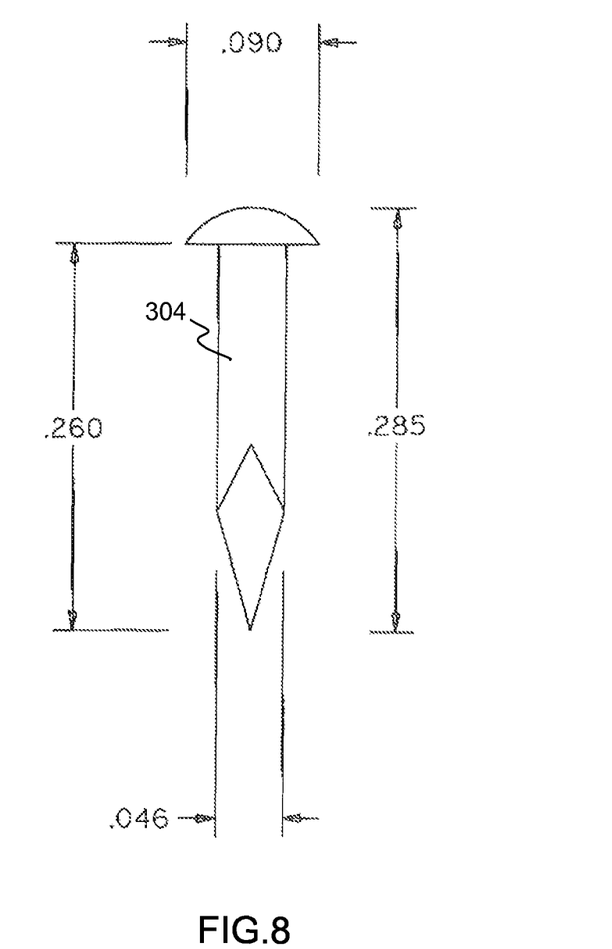
FIG. 8 illustrates an exemplary conductive brad.

FIG. 8 illustrates exemplary brad 304 in more detail. Brad 304 is preferably made of a conductive material, for example brass. While brad 304 may be a standard brad, other kinds of conductive members and materials may be used.

Figure 9:
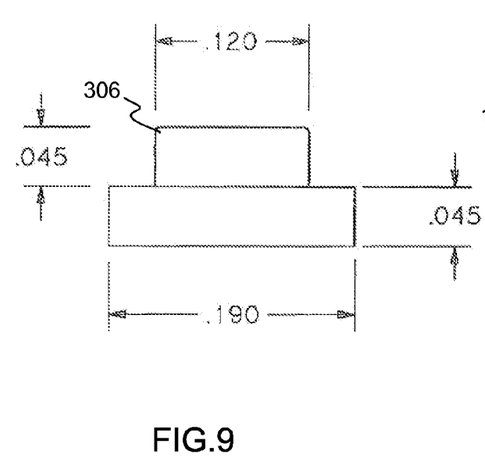
FIG. 9 illustrates an exemplary contact.

FIG. 9 illustrates exemplary contact 306 in more detail. Contact 306 is also preferably made of a conductive material such as brass or another suitable material.

Figure 10A:
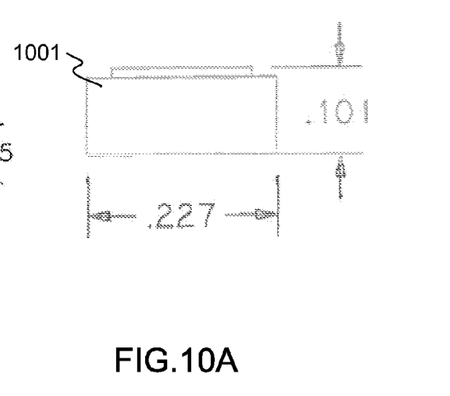
FIGS. 10A and 10B illustrate a single battery and exemplary battery pack.
Figure 10B:
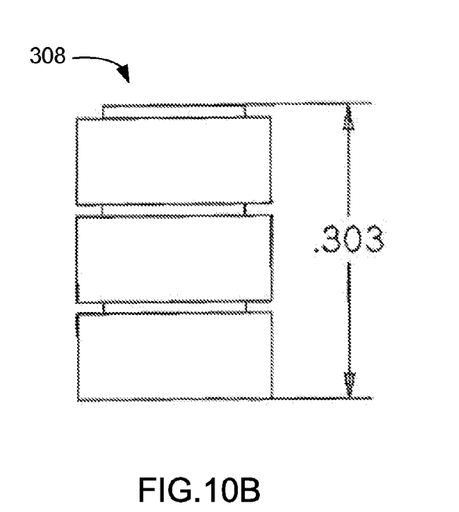

FIGS. 10A and 10B illustrate a single battery 1001 and exemplary battery pack 308 in more detail. It is to be understood that a different number of batteries may be used.

Figure 11:
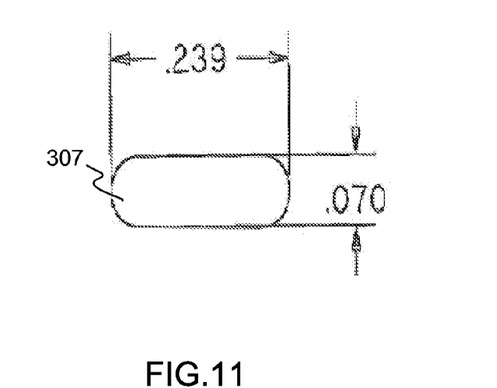
FIG. 11 illustrates an exemplary o-ring.

FIG. 11 illustrates o-ring 307 in more detail. O-ring 307 may be a standard part, made of neoprene, EPDM, or another suitable material. Other compliant members may be used in place of o-ring 307.

Figure 12A:
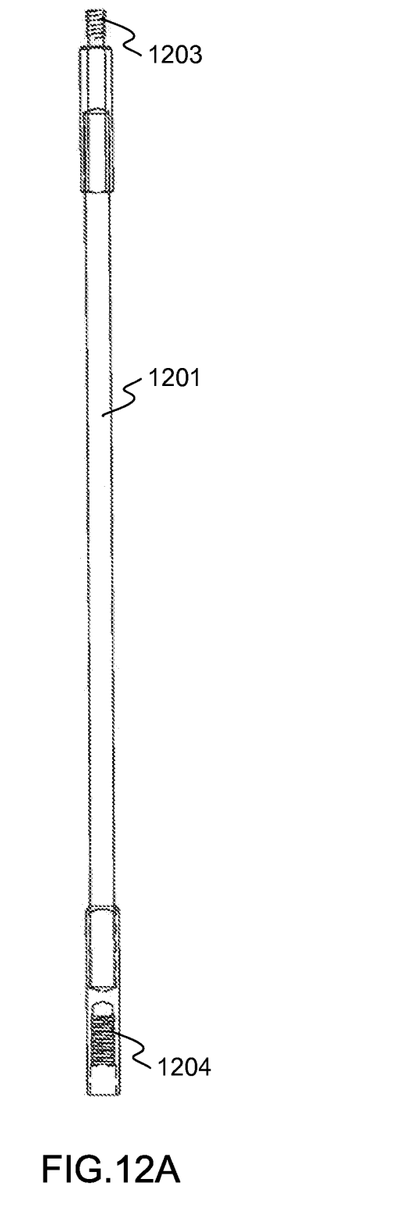
FIGS. 12A and 12B illustrate exemplary rods configured to connect to a lighted tip, in accordance with embodiments of the invention.
Figure 12B:
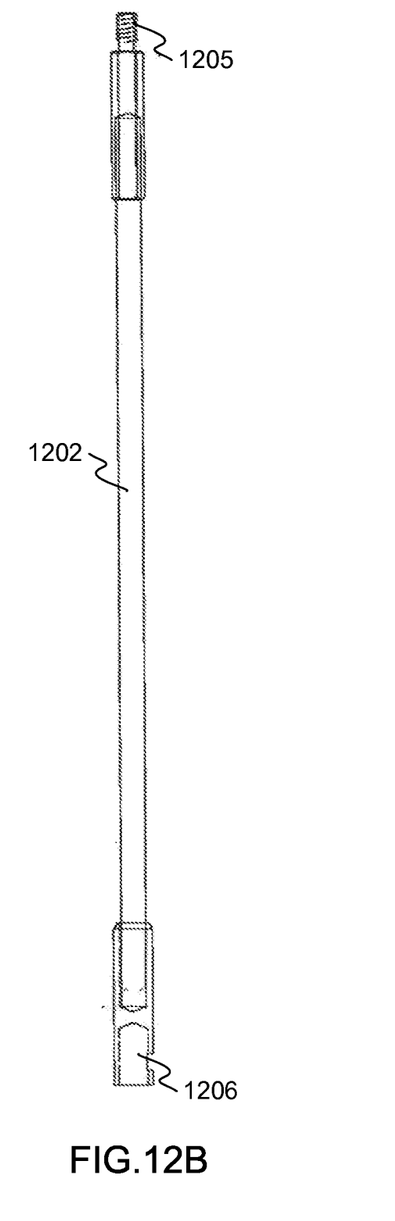

FIGS. 12A and 12B illustrate exemplary rods 1201 and 1202, each configured to connect to a lighted tip in accordance with embodiments of the invention. Exemplary rod 1201 includes a male threaded connector 1203 at its distal end and a female threaded connector 1204 at its proximal end. Male threaded connector 1203 is compatible with threaded connector 103 of main body 101. A lock washer may be provided to help secure rod 1201 to main body 101. Connector 1204 is preferably compatible with a rod system and is used to connect a lighted tip such as tip 101 with a longer push-pull rod.

Exemplary rod 1202 also includes a male threaded connector 1205 at its distal end, compatible with mechanical connector 103 of main body 101. However, at its proximal end, rod 1202 includes a quick connect type connector 1206, for example a connector compatible with the ROYRODS™ rod system available from Labor Saving Devices, Inc. of Commerce City, Colo., USA.

Figure 13:
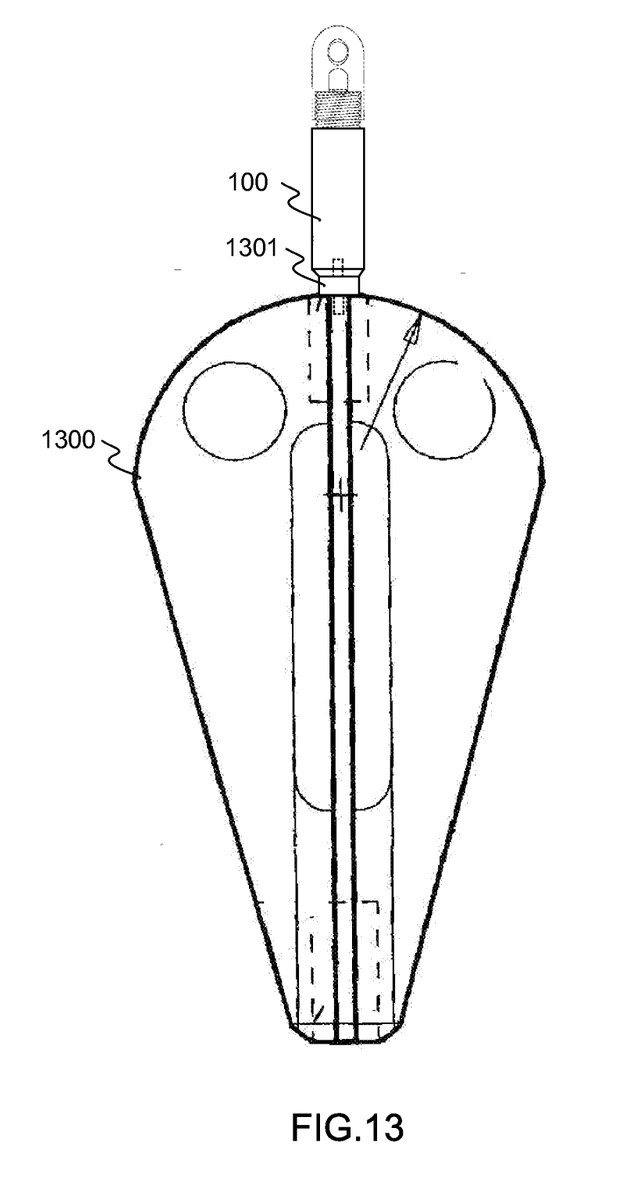
FIG. 13 illustrates a use of a lighted tip, in accordance with embodiments of the invention.

FIG. 13 illustrates another use of a lighted tip such as tip 100. In this exemplary use, lighted tip 100 is mounted to a steerable tip 1300. Steerable tip 1300 may be, for example, any tip described in U.S. patent application Ser. No. 11/682, 819 filed Mar. 6, 2007 and titled "Steerable Tip for Flexible Rods", the entire disclosure of which is hereby incorporated by reference herein. Other kinds of steerable tips may be used as well. Steerable tip 1300 may be attached to a flexible rod such as a push-pull rod, and may enable an installer to, by rotating the rod, "walk" the tip back and forth across a horizontal surface to steer the tip to a preferred location for running a wire or cable, as the fins of the steerable tip to engage the flat surface and move the rod. Such operations are often carried out in dark spaces. Attaching lighted tip 100 to steerable tip 1300 may enable the installer to better see the tip and its position, easing the installation job. In some embodiments, steerable tip may have a female connector embedded in its distal end, and a short adapter 1301 may make the connection between steerable tip 1300 and lighted tip 100.

The invention has now been described in detail for the purposes of clarity and understanding. However, those skilled in the art will appreciate that certain changes and modifications may be practiced within the scope of the appended claims.

What is claimed is:

1. A lighted tip for attachment to a flexible rod, the lighted tip comprising:
    a tip body having proximal and distal ends;
    a mechanical connector at the proximal end configured for connection to the flexible rod axially aligned with the tip body;
    a threaded holder coupled to the distal end of the tip body by threads;
    a dome-shaped lens connected to the threaded holder; and
    a light source that emits light through the lens, wherein the light source is disposed at least partially within the dome-shaped lens;
    one or more batteries disposed within the tip body;
    wherein a circuit between the one or more batteries and the light source is completed or interrupted as the threaded holder, the lens, and the light source move together in relation to the tip body as the threaded holder is rotated in relation to the tip body, thereby switching the light source on or off.

2. The lighted tip of claim 1, wherein the lighted tip defines a transverse through hole to enable connection of a wire or cable to the lighted tip.

3. The lighted tip of claim 2, wherein the lens defines the transverse through hole.

4. The lighted tip of claim 1, wherein the tip body is generally cylindrical and the diameter of the tip body is about 5/16 inches or less.

5. The lighted tip of claim 1, wherein the lens defines a longitudinal hole at a distal end of the lens.

6. The lighted tip of claim 5, wherein the longitudinal hole allows threading of other attachments to the distal end of the lens.

7. The lighted tip of claim 1, wherein the lens is rounded at a distal end of the lens.

\* \* \* \* \*